(12) United States Patent
Miyamoto

(10) Patent No.: US 6,379,279 B1
(45) Date of Patent: Apr. 30, 2002

(54) GEAR TYPE AUTOMATIC TRANSMISSION UNIT AND METHOD FOR CONTROLLING THE SAME

(75) Inventor: Shoichi Miyamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 4 days.

(21) Appl. No.: 09/628,167

(22) Filed: Jul. 28, 2000

(30) Foreign Application Priority Data

Jan. 28, 2000 (JP) ........................................ 2000-019899

(51) Int. Cl.[7] ............................ B60K 41/02; B60K 41/28
(52) U.S. Cl. ........................ 477/87; 192/3.56; 477/906
(58) Field of Search ............................ 477/86, 87, 179, 477/906; 192/21.5, 3.56; 701/62

(56) References Cited

U.S. PATENT DOCUMENTS

| | | | | |
|---|---|---|---|---|
| 4,403,683 A | * | 9/1983 | Takano | 477/87 X |
| 4,425,992 A | * | 1/1984 | Makita | 192/82 T |
| 4,502,579 A | * | 3/1985 | Makita | 192/82 T X |
| 4,567,969 A | * | 2/1986 | Makita | 192/3.56 |
| 4,805,751 A | * | 2/1989 | Ohkuno et al. | 477/179 X |

FOREIGN PATENT DOCUMENTS

JP    63-270252    11/1988    ........... B60K/41/02

* cited by examiner

Primary Examiner—Rodney H. Bonck
(74) Attorney, Agent, or Firm—Sughrue Mion, PLLC

(57) ABSTRACT

In a gear type automatic transmission system which senses a shift·select position of a gear transmission stage by a shift·select position sensor 6, then switches automatically the gear transmission stage of a gear type automatic transmission unit 3 into a target transmission stage by a gear switching actuator 5, and then transmits or cuts off a power from an output shaft 21 of an engine 1 to an input shaft 22 of the gear type automatic transmission unit 3 by an electromagnetic clutch 2, clutch engagement in starting is carried out more quickly than the normal operation, in the fault operation of the gear type automatic transmission unit. In addition, the clutch engagement to cause the vehicle to run at a creeping speed (creep) without depression of an accelerator pedal (partial clutch engagement) can be inhibited.

4 Claims, 3 Drawing Sheets

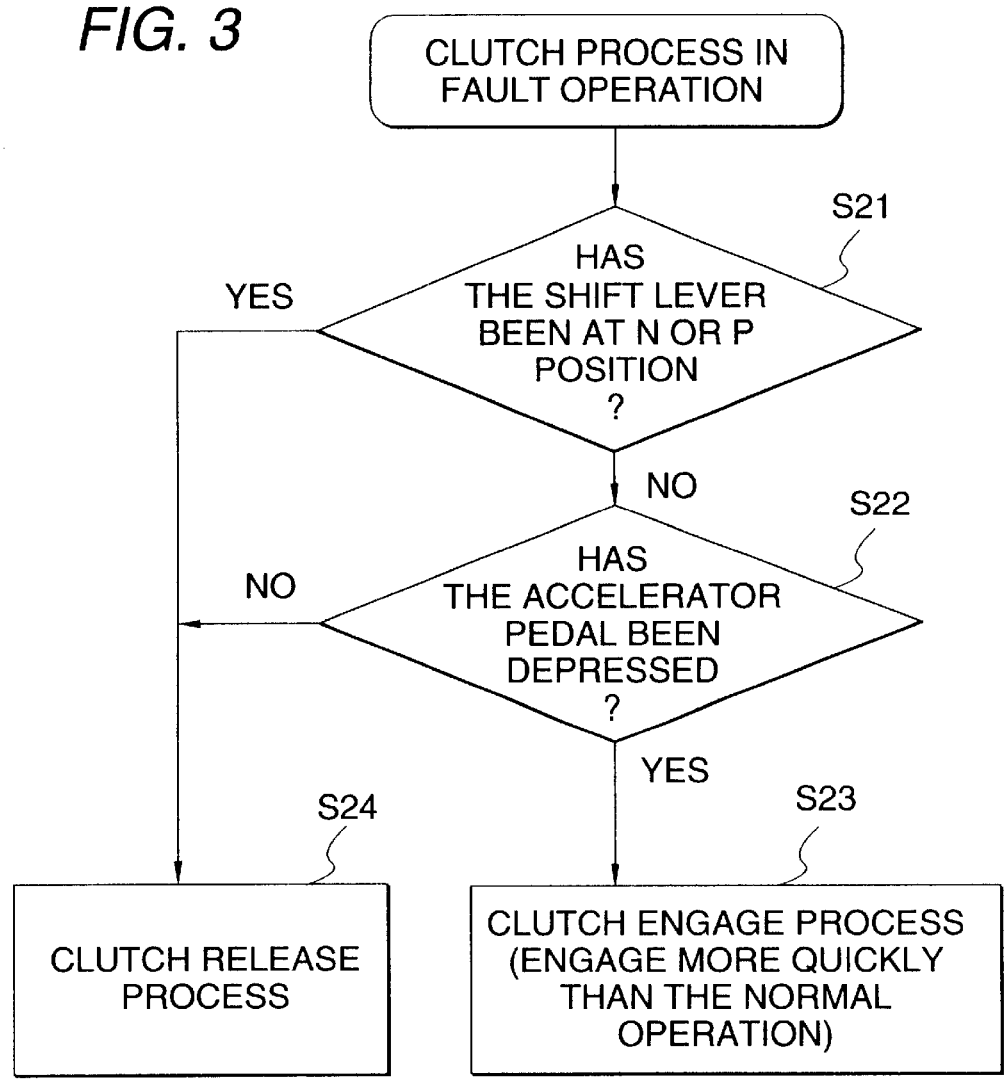

GEAR TYPE AUTOMATIC TRANSMISSION UNIT AND METHOD FOR CONTROLLING THE SAME

BACKGROUND OF THE INVENTION

The present invention relates to a clutch control method of a gear type automatic transmission unit and, more particularly, a technology for improving the reliability of the clutch in the fault operation of the gear type automatic transmission unit.

In the prior art, as the control method of the gear type automatic transmission unit, there are the methods as disclosed in the Unexamined Japanese Patent Application Publication No. Sho 63-270252, etc., for example. In this method, the driving force of the engine is input into the gear type automatic transmission unit by turning ON/OFF the electromagnetic clutch. Then, the switching of the speed changing gear stage is performed by driving the selecting three-position hydraulic cylinder based on operational combinations of a pair of hydraulic solenoid valves to select the transmission gear, and then driving the shifting three-position hydraulic cylinder based on the operational combinations of a pair of hydraulic solenoid valves.

In the event that the failure of the gear type automatic transmission unit disables the transmission operation, its operable condition must be maintained as long as possible as the emergency evacuation. At this time, it is of course that, since the transmission stage is fixed, all operations such as starting, running, stopping, etc. required for the traveling of the vehicle must be handled by only one transmission stage. In other words, when the gear stage is fixed to the second speed range, the third speed range, the fourth speed range, or the fifth speed range by the fault, the vehicle must be started by using such fixed transmission stage.

When the transmission stage is fixed to the second speed range, the third speed range, the fourth speed range, or the fifth speed range, the driving force is smaller than the first speed range. Therefore, the clutch must be engaged for a longer time until the vehicle is started. As a consequence, if the same clutch engagement as the first speed range is carried out in the second speed range, the third speed range, the fourth speed range, or the fifth speed range, such a time is extended that either the output side (transmission unit side) of the clutch can not be rotated even when the input side (engine side) of the clutch is rotated, or difference in the number of rotation between the input side and the output side of the clutch, i.e., the clutch slipping is caused. Thus, the problem is caused that, if such clutch slipping is generated for a long while, the failure of the clutch unit is generated due to the wear or the heat generation of the engaging surfaces of the clutch.

SUMMARY OF THE INVENTION

The present invention has been made to overcome the above-mentioned problem, and it is an object of the present invention to suppress the clutch slipping in engaging the clutch and to thus prevent the failure of the clutch, when the failure of a gear type automatic transmission unit disables the transmission operation.

The invention set forth in aspect 1 has such an aspect that a gear type automatic transmission system comprises a gear type automatic transmission unit for sensing at least a shift-select position of a gear transmission stage and automatically switching a gear into a target transmission stage by a gear switching actuator; and a clutch for transmitting or cutting off a power from an output shaft of an engine to an input shaft of the gear type automatic transmission unit; wherein clutch engagement is carried out more quickly than a normal operation upon starting in a fault operation of the gear type automatic transmission unit.

The invention set forth in aspect 2 has such an aspect that, in the invention set forth in aspect 1, clutch engagement to cause a vehicle to run at a creeping speed (creep) without depression of an accelerator pedal (partial clutch engagement) can be inhibited in the fault operation of the gear type automatic transmission unit.

The invention set forth in aspect 3 has such an aspect that a method of controlling a gear type automatic transmission system comprises the steps of sensing at least a shift-select position of a gear transmission stage; switching automatically a gear of a gear type automatic transmission unit into a target transmission stage; and transmitting or cutting off a power from an output shaft of an engine to an input shaft of the gear type automatic transmission unit by a clutch; wherein clutch engagement is carried out more quickly than a normal operation upon starting in a fault operation of the gear type automatic transmission unit.

The invention set forth in aspect 4 has such an aspect that, in the invention set forth in aspect 3, clutch engagement to cause a vehicle to run at a creeping speed (creep) without depression of an accelerator pedal (partial clutch engagement) can be inhibited in the fault operation of the gear type automatic transmission unit.

BRIEF DESCRIPTION OF THE DRAWINGS

FIG. 3 is a flowchart showing clutch process in a fault operation of the gear type automatic transmission unit according to the embodiment of the present invention.

DETAILED DESCRIPTION OF THE PREFERRED EMBODIMENTS (Embodiment 1)

Figure 1:
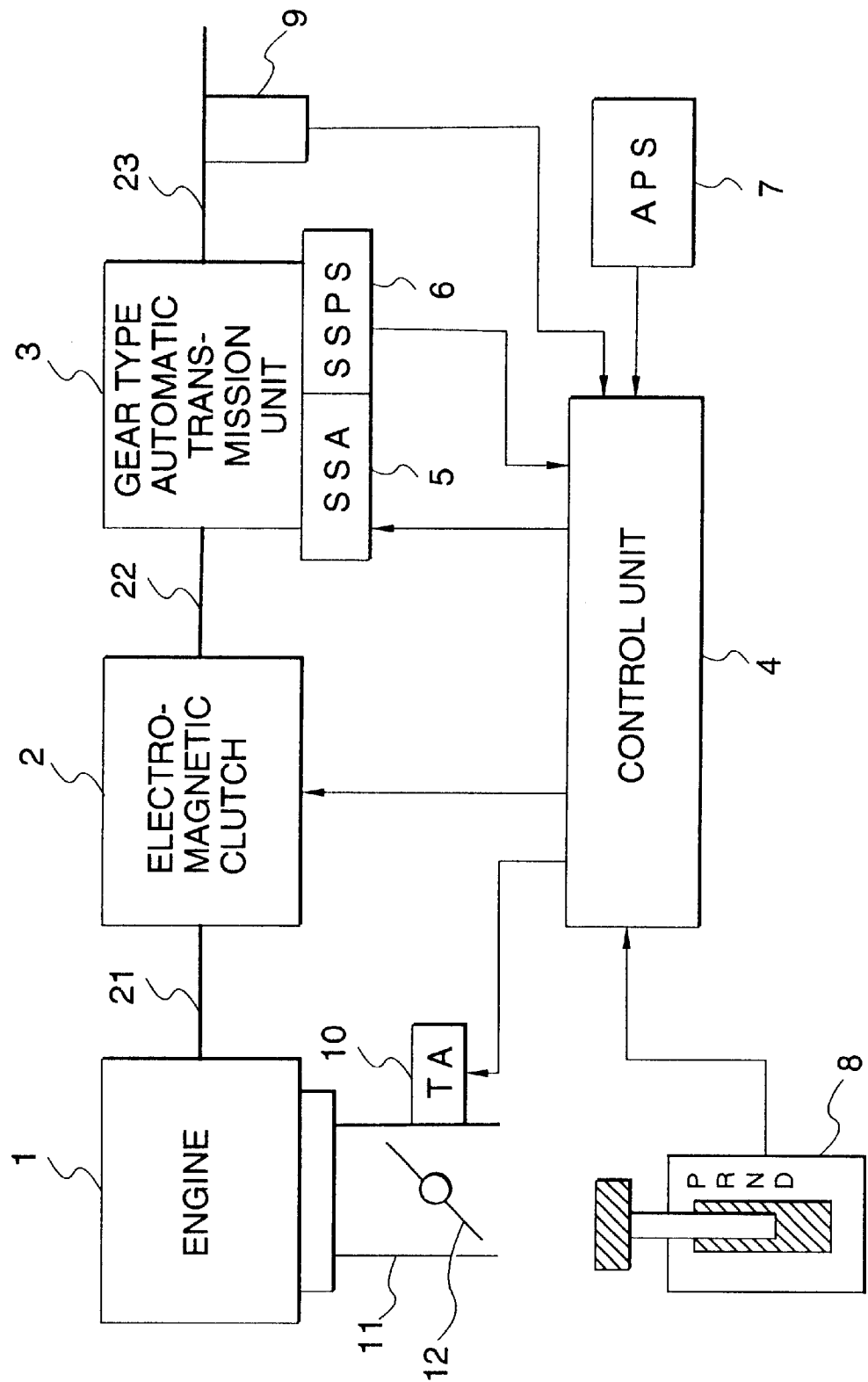
FIG. 1 is a block diagram showing a configuration of a gear type automatic transmission unit according to an embodiment of the present invention.

FIG. 1 is a block diagram showing a configuration of a gear type automatic transmission unit according to an embodiment 1 of the present invention. In FIG. 1, a crankshaft 21 as an output shaft of an engine 1 of a car, etc. is connected to an input shaft of an electromagnetic clutch 2, and an output shaft of the electromagnetic clutch 2 is connected to an input shaft of the gear type automatic transmission unit 3. A control unit 4 electronically controls the gear type automatic transmission unit 3, and comprises a central processing unit (CPU), memories (ROM, RAM), an interface for transmitting/receiving input signals and output signals of various sensors, etc., for example.

A throttle valve 12 for adjusting an amount of air supplied to the engine 1 is provided to an inlet pipe 11 of the engine 1. This throttle valve 12 is driven and controlled by a throttle actuator (TA) 10. In more detail, the control unit 4 signal-processes an output signal of an accelerator position sensor 7, which is in proportion to a depressed amount of the accelerator pedal (not shown) by the driver, and then feedback-controls the throttle actuator (TA) 10 to attain a target throttle opening position in response to the depressed amount of the accelerator pedal.

The electromagnetic clutch 2 has a role to perform transmission/cut-off of the power from the crankshaft 21 of the engine 1 to the input shaft 22 of the gear type automatic transmission unit 3, and is controlled by the control unit 4 by using a clutch exciting current which is proportional to the clutch transmission torque. The electromagnetic clutch is employed in this example, but the hydraulic clutch may be employed as such clutch.

The gear type automatic transmission unit 3 has five sets of forward transmission gears with different gear ratios and one set of backward transmission gears, for example. The transmission operation of this gear type automatic transmission unit 3 is feedback-controlled by sensing its shift·select position by a shift·select·position sensor (SSPS) 6 and then switching the gear by a gear switching shift·select·actuator (SSA) 5, which is controlled by an output signal of the control unit 4, to get a target transmission stage.

The control unit 4 receives a shift lever position signal which outputs a switch signal in response to the position of the shift lever 8 operated by the driver, a signal of the accelerator position sensor 7 indicating a depressed amount of the accelerator pedal (not shown), and a signal of a transmission unit output shaft rotation sensor 9 which senses the rotational speed of an output shaft 23 of the gear type automatic transmission unit. Then, the control unit 4 decides the transmission stage which is suitable for the vehicle running state based on the transmission unit shifting patterns (not shown), and then causes the transmission unit to carry out the transmission operation by outputting the control signal to the shift·select·actuator 5 while sensing the shift·select position by the shift·select·position sensor 6.

Next, an operation of the embodiment of the present invention will be explained hereunder.

Figure 2:
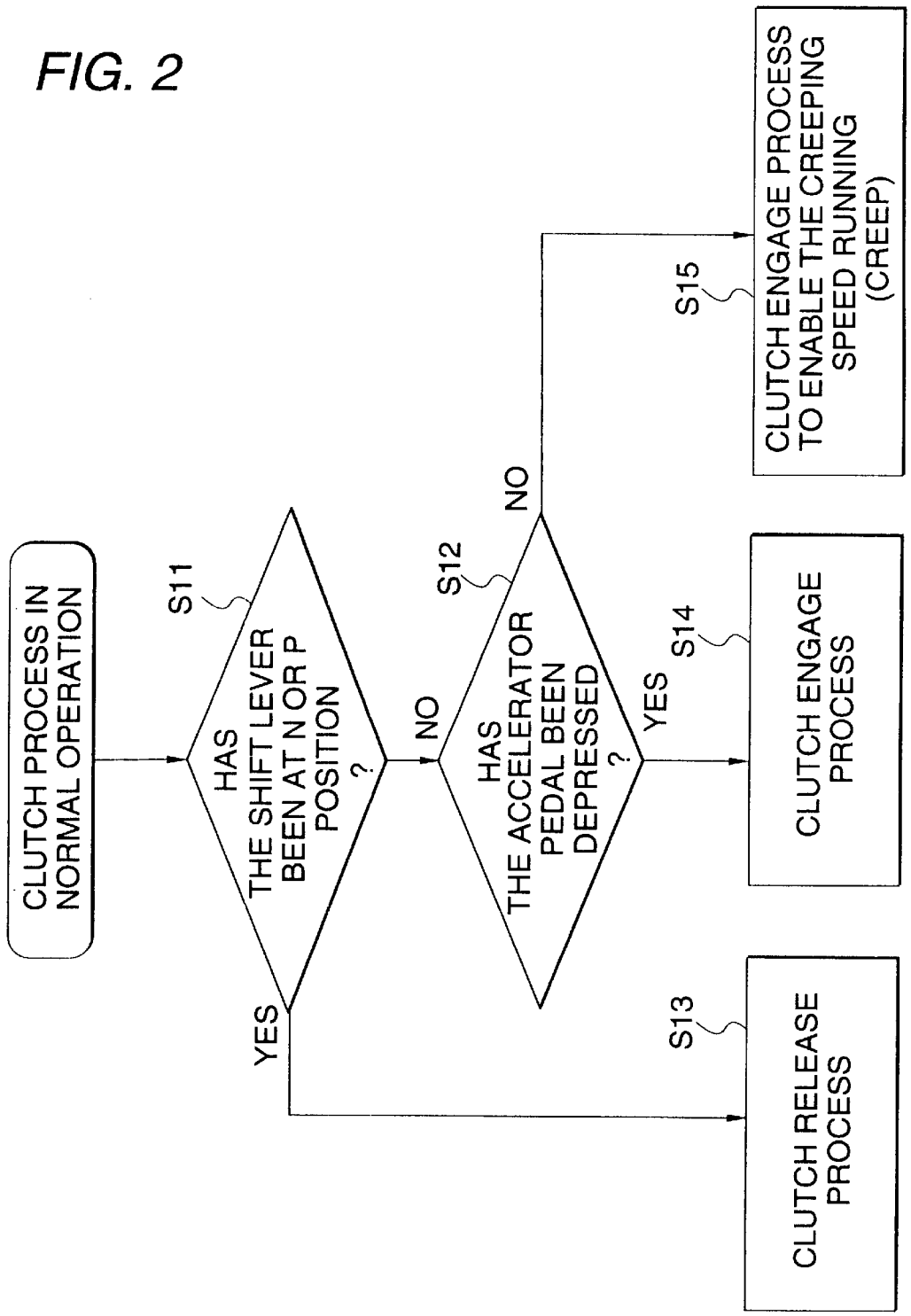
FIG. 2 is a flowchart showing clutch process in a normal operation of the gear type automatic transmission unit according to the embodiment of the present invention.

FIG. 2 is a flowchart showing clutch control when the gear type automatic transmission unit is started in normal state.

The control unit 4 reads a shift lever position (e.g., P, R, N, D position) signal, which is output by a shift lever 8 as a switch signal, in answer to a motion of the shift lever 8 operated by the driver. Also, the control unit 4 senses the accelerator opening by receiving a depressed amount of the accelerator pedal by the driver from the accelerator position sensor 7 as a voltage value.

In step S11, it is decided whether or not the shift lever position is at an N or P position. Unless the shift lever position is the P (Parking) or N (Neutral) position, the process goes to step S12. Then, it is decided whether or not the accelerator pedal has been depressed. In contrast, in step S11, if the shift lever position is the P or N position, the process proceeds to step S13 where clutch release process of the electromagnetic clutch 2 is carried out.

In step S12, it is decided whether or not the accelerator pedal has been depressed. If the accelerator pedal has been depressed, the process advances to step S14 where clutch engage process of the electromagnetic clutch 2 is carried out. Unless the accelerator pedal has been depressed, the process advances to step S15 where clutch engage process to enable the vehicle to run at the creeping speed (partial clutch engagement) is carried out.

FIG. 3 is a flowchart showing clutch control when the vehicle is started in the situation that the transmission stage is fixed due to the failure of the gear type automatic transmission unit 3, the shift·select·actuator (SSA) 5, or the shift·select·position sensor (SSPS) 6.

Like FIG. 2, the control unit 4 reads the shift lever position (e.g., P, R, N, D position) signal, which is output as the switch signal by the shift lever 8 in answer to the motion of the shift lever 8 operated by the driver. Also, the control unit 4 senses the accelerator opening by receiving the depressed amount of the accelerator pedal by the driver from the accelerator position sensor 7 as the voltage value.

Then, in step S21, it is decided whether or not the shift lever position is at the N or P position. Unless the shift lever position is the P or N position, the process goes to step S22 where it is decided whether or not the accelerator pedal has been depressed. In contrast, if the shift lever position is the P or N position, the process proceeds to step S24 where clutch release process is carried out.

In step S22, if the accelerator pedal has been depressed, the process goes to step S23. Then, clutch engage process to engage the clutch more quickly than the normal operation is executed. This quick clutch engagement contains of course the case where the time from start of the clutch engagement to the end is accelerated, and also contains the case where the clutch engagement is accelerated more quickly than the normal operation up to the middle way from the start of the clutch engagement and then is decelerated slowly after the clutch has been engaged to some extent.

In step S22, unless the accelerator pedal has been depressed, the process goes to step S24 without the clutch engage process which enables the vehicle to run at the creeping speed (partial clutch engagement). Then, clutch release process is carried out.

According to the present invention set forth in aspect 1 or aspect 3, in the fault operation of the gear type automatic transmission unit, such an advantage can be achieved that, since the clutch engagement in starting is accelerated more quickly than the normal operation, the clutch slipping can be suppressed when the clutch is engaged and thus the failure of the clutch can be prevented.

According to the present invention set forth in aspect 2 or aspect 4, in the fault operation of the gear type automatic transmission unit, such an advantage can be achieved that, since the clutch engagement to cause the vehicle to run at the creeping speed (creep) without depression of the accelerator pedal (partial clutch engagement) can be inhibited, the clutch slipping can be suppressed when the clutch is engaged and thus the failure of the clutch can be prevented.

What is claimed is:

1. A gear type automatic transmission system, comprising:

a gear type automatic transmission unit for sensing at least a shift·select position of a gear transmission stage and automatically switching a gear into a target transmission stage by a gear switching actuator; and a clutch for transmitting or cutting off a power from an output shaft of an engine to an input shaft of said gear type automatic transmission unit; wherein clutch engagement is carried out more quickly than a normal operation upon starting in a fault operation of said gear type automatic transmission unit.

2. The gear type automatic transmission system according to claim 1, wherein clutch engagement to cause a vehicle to run at a creeping speed without depression of an accelerator pedal is inhibited in the fault operation of said gear type automatic transmission unit.

3. A method of controlling a gear type automatic transmission system, comprising the steps of:

sensing at least a shift·select position of a gear transmission stage;

switching automatically a gear of a gear type automatic transmission unit into a target transmission stage; and transmitting or cutting off a power from an output shaft of an engine to an input shaft of said gear type automatic transmission unit by a clutch; wherein clutch engagement is carried out more quickly than a normal operation upon starting in a fault operation of said gear type automatic transmission unit.

4. The method of controlling a gear type automatic transmission system according to claim 3, further comprising inhibiting clutch engagement to cause vehicle to run at creeping speed without depression of an accelerator pedal in the fault operation of said gear type automatic transmission unit.

* * * * *